(12) United States Patent
Yu

(10) Patent No.: US 9,479,247 B2
(45) Date of Patent: Oct. 25, 2016

(54) METHODS AND APPARATUS FOR PRE AND POST EQUALIZATION IN OPTICAL COMMUNICATIONS SYSTEMS

(71) Applicant: ZTE (USA) Inc., Morristown, NJ (US)

(72) Inventor: Jianjun Yu, Basking Ridge, NJ (US)

(73) Assignee: ZTE (USA) Inc., Austin, TX (US)

( * ) Notice: Subject to any disclaimer, the term of this patent is extended or adjusted under 35 U.S.C. 154(b) by 217 days.

(21) Appl. No.: 13/912,138

(22) Filed: Jun. 6, 2013

(65) Prior Publication Data

US 2013/0330070 A1    Dec. 12, 2013

Related U.S. Application Data

(60) Provisional application No. 61/656,491, filed on Jun. 6, 2012.

(51) Int. Cl.
| | | |
|---|---|---|
| *H04B 10/04* | (2006.01) | |
| *H04B 10/077* | (2013.01) | |
| *H04B 10/2507* | (2013.01) | |
| *H04B 10/50* | (2013.01) | |
| *H04B 10/54* | (2013.01) | |

(52) U.S. Cl.
CPC ...... *H04B 10/0775* (2013.01); *H04B 10/2507* (2013.01); *H04B 10/506* (2013.01); *H04B 10/5053* (2013.01); *H04B 10/541* (2013.01); *H04B 2210/254* (2013.01)

(58) Field of Classification Search
None
See application file for complete search history.

(56) References Cited

U.S. PATENT DOCUMENTS

| | | | |
|---|---|---|---|
| 5,963,312 A * | 10/1999 | Roberts | 356/73.1 |
| 2004/0197103 A1* | 10/2004 | Roberts | H04B 10/2543 398/159 |
| 2007/0206954 A1* | 9/2007 | Fishman et al. | 398/159 |
| 2008/0130771 A1* | 6/2008 | Fechtel et al. | 375/260 |
| 2009/0238580 A1 | 9/2009 | Kikuchi | |
| 2010/0028007 A1* | 2/2010 | Miura et al. | 398/81 |
| 2011/0081146 A1 | 4/2011 | Nakajima et al. | |

FOREIGN PATENT DOCUMENTS

| | | |
|---|---|---|
| JP | 2011-082749 A | 4/2011 |
| JP | 2011-514736 A | 5/2011 |

(Continued)

OTHER PUBLICATIONS

Huang et al., "terabit/s optical superchannel with flexible modulation format for dynamic distance/route transmission", Jan. 23, 2012, OFC/NFOEC Technical Digest, pp. 1-3.*

(Continued)

*Primary Examiner* — Ken N Vanderpuye
*Assistant Examiner* — David Lambert
(74) *Attorney, Agent, or Firm* — Perkins Coie LLP

(57) ABSTRACT

An optical communication system includes a transmission apparatus that transmits a test signal over an optical communication medium using a first optical modulation format, receives a reception report for the test signal, determines, based on the received reception report, a pre-equalization scheme, applies the pre-equalization to data transmitted from the transmitter side to generate pre-equalized data and transmits the pre-equalized data using a second optical modulation format based on the reception report. An optical reception apparatus receives the test signal, computes a channel transfer function based on the received test signal, and transmits the reception report.

19 Claims, 11 Drawing Sheets

(56) References Cited

FOREIGN PATENT DOCUMENTS

JP    2011-211516 A    10/2011
WO    2009/100252 A2    8/2009

OTHER PUBLICATIONS

Bosco et a., "On the Performance of Nyquist-WDM Terabit Superchannels Based on PM-BPSK, PM-QPSK, PM-8QAM or PM-16QAM Subcarriers", Jan. 1, 2011, Journal of Lightwave Technology, vol. 29, pp. 53-61.*

El Said et al., "An Electrically Pre-Equalized 10-Gb/s Duobinary Transmission System", Jan. 2005, Journal of Lightwave Technology, vol. 23, No. 1, pp. 388-400.*

Dong, Z., et al., "6x128-Gb/s Nyquist-WDM PDM-16QAM Generation and Transmission over 1200-km SMF-28 with SE of 7.47b/s/Hz," Journal of Lightwave Technology, 30(24):4000-4005, Dec. 2012.

Dong, Z., et al., "6x144-Gb/s Nyquist-WDM PDM-64QAM Generation and Transmission on a 12-GHz WDM Grid Equipped With Nyquist-Band Pre-Equalization," Journal of Lightwave Technology, 30(23):3687-3692, Dec. 2012.

Extended European Search Report mailed on Aug. 16, 2013 for European Application No. 13275135.5, filed Jun. 5, 2013 (11 pages).

Japanese Office Action mailed Jul. 8, 2014 for Japanese Application No. 2013-118738, filed Jun. 5, 2013, translation included (5 pages).

Zhou, X., et al., "PDM-Nyquist-32QAM for 450-Gb/s Per-Channel WDM Transmission on the 50 GHz ITU-T Grid," Journal of Lightwave Technology, 30(4):553-559, Feb. 2012.

* cited by examiner

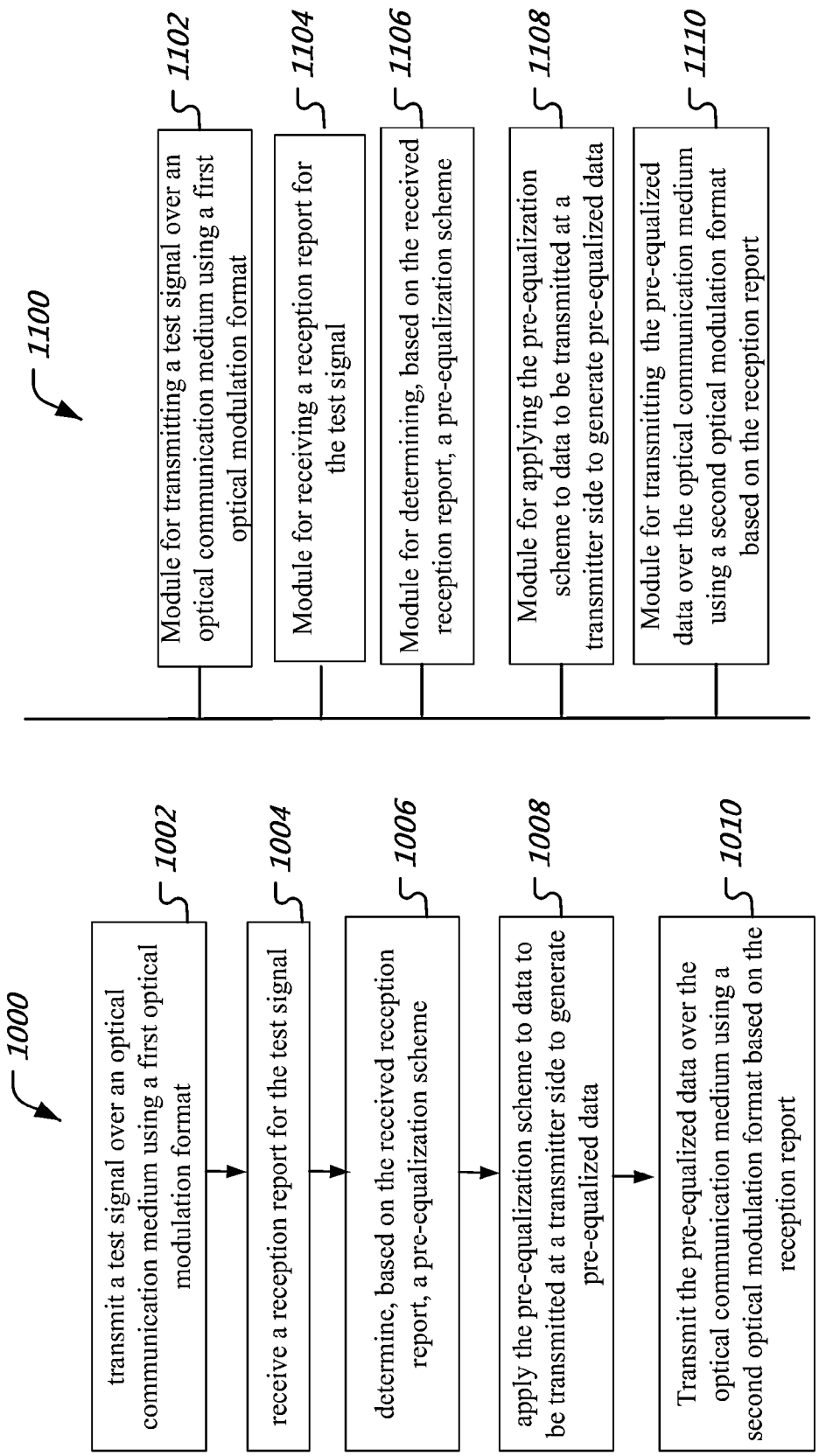

METHODS AND APPARATUS FOR PRE AND POST EQUALIZATION IN OPTICAL COMMUNICATIONS SYSTEMS

CROSS REFERENCE TO RELATED APPLICATIONS

This patent document claims the benefit of U.S. Provisional Patent Application No. 61/656,491, filed Jun. 6, 2012. The entire content of the before-mentioned patent application is incorporated by reference as part of the disclosure of this application.

BACKGROUND

This document relates to optical communication systems.

With the advent of transmission of multimedia content such as video over the Internet and other communications networks, there is any ever-increasing need for increased data rate capacity on communication networks. Often, optical networks for backbones of communications network, where the increased traffic at the edges of the network aggregates to several gigabit of network traffic. Therefore, there is an increasing need for optical communication techniques to meet the demand on communications network data capacity. However, laying down optical transmission media such as fiber optics often requires large amount of capital expenditure and may not always be a suitable options due to the expenses involved and other regulatory issues.

Techniques for improved optical transceiver techniques.

SUMMARY

This document describes technologies, among other things, that may be used to implement optical transmitters and receivers that perform pre-equalization and post-equalization for increased sustained bandwidth throughput in optical communication systems.

The Nyquist wavelength-division multiplexing technique enable a solution to achieve high spectral efficiency in long-haul transmission system. Compare to polarization division multiplexing quadrature-phase-shift-keying, even high-level modulation scheme such as polarization division multiplexing, 16-quadrature-amplitude-modulation is much more sensitive to intra-channel noise and inter-channel linear crosstalk caused by Nyquist wavelength-division multiplexing. We experimentally demonstrated the generation and transmission of the 6×128-Gb/s Nyquist wavelength-division multiplexing sixteen quadrature amplitude modulation signal over 1200-km single-mode fiber (SMF)-28 with Erbium-doped fiber amplifier only amplification with a net Spectral Efficiency (SE) of 7.47 b/s/Hz, which is so far, to our knowledge, the highest SE for the signal with the bit rate above 100-Gb/s using the polarization-division multiplexing 16-quadrature-amplitude-modulation format. This experiment was successfully enabled by digital-signal-processing (DSP) pre-equalization of transmitter-side impairments and DSP post-equalization of the channel and receiver-side impairments. Nyquist-band is considered in the pre-equalization to enhance the tolerance of the polarization-division multiplexing 16-quadrature-amplitude-modulation to the aggressive spectral shaping. The bit error rate for each of the 6 channels is smaller than the limitation of the forward-error-correction limit of $3.8 \times 10^{-3}$ after 1200-km SMF-28 transmission.

In one aspect, methods, systems and apparatus for optical communication are disclosed. A test signal is transmitted over an optical communication medium using a first optical modulation format. A reception report that is based on the test signal is received. Based on the received reception report, a pre-equalization scheme is determined. The pre-equalization scheme is applied to data to be transmitted at a transmitter-side to generate pre-equalized data. The pre-equalized data is transmitted over the optical communication medium using a second optical modulation format that is based on the reception report.

These and other aspects, and their implementations and variations are set forth in the drawings, the description and the claims.

BRIEF DESCRIPTION OF THE DRAWINGS

FIG. 10 is a flow chart representation of a process of optical communications.

FIG. 11 is a block diagram representation of an apparatus for wireless communications.

Like reference symbols in the various drawings indicate like elements.

DETAILED DESCRIPTION

Figure 1:
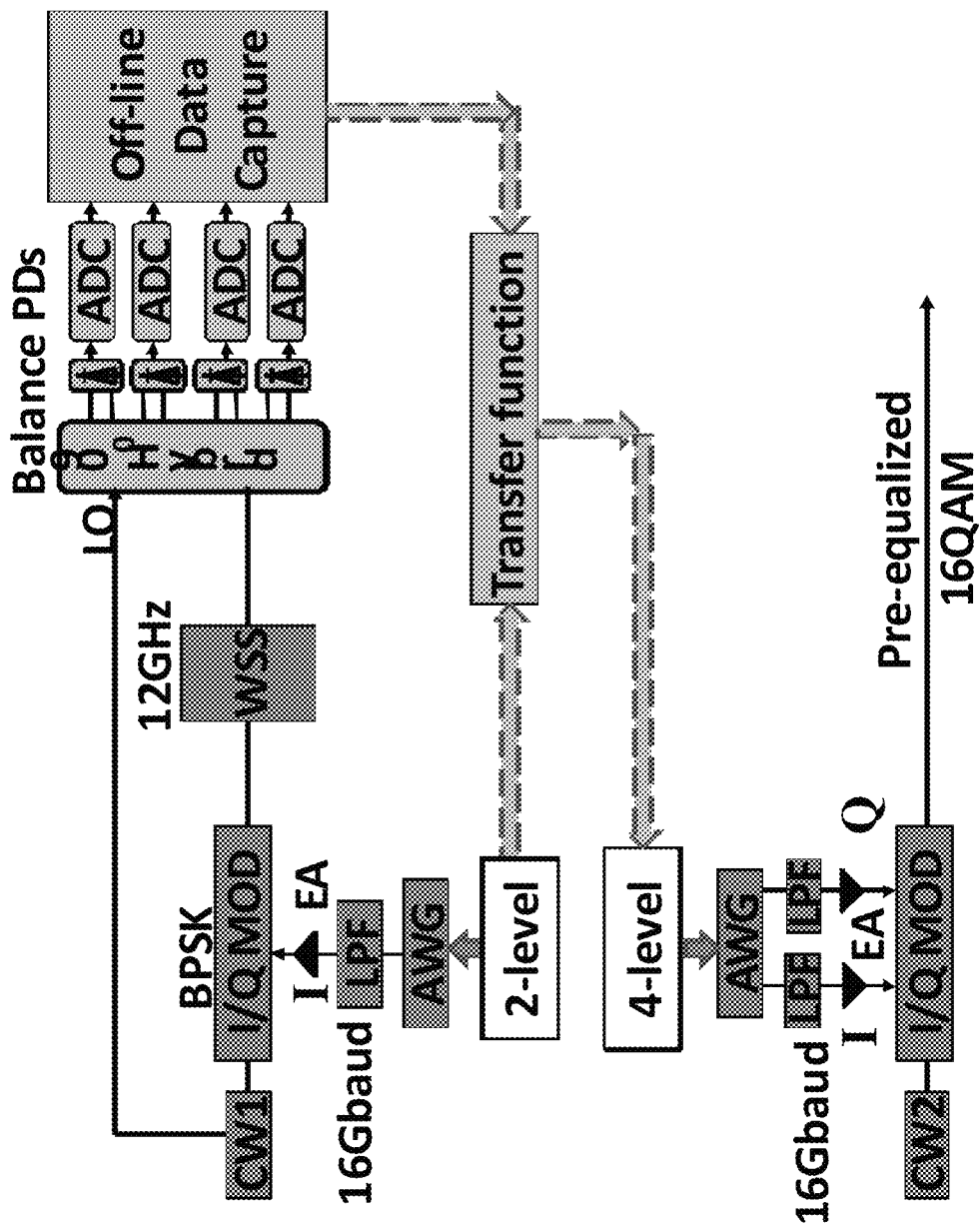
FIG. 1 depicts an architectural block diagram for implementing pre-equalization using the following abbreviations. AWG: arbitrary waveform generator, LPF: low pass filter, EA: electrical amplifier, WSS: wavelength selective switch, CW: continuous lightwave, LO: local oscillator, ADC: analog-to-digital converter, I: in-phase, Q: quadrature.

The methods, systems, apparatus described in this document are useful, in one aspect, in achieving higher bandwidth throughputs than ever before in an optical communications system. In one aspect, a pre-equalization technique is disclosed that can be used to pre-equalize an optical signal at the transmitter-side. One advantageous aspect of the pre-equalization is to partially overcome distortions due to the transfer function of the optical communications channel.

In the description below, several embodiments have been discussed with specific references to modulation and other physical layer parameter values. However, the general applicability of the principles discussed will be appreciated by one of skill in the art.

With the commercialization of 100 G Ethernet, increasing spectral efficiency (SE) to meet the bandwidth requirement is a good solution for the next generation optical transmission systems and networks. It has been recently experimentally demonstrated that the transmission system, adopting polarization division multiplexing (PDM) quadrature-phase-shift-keying (PDM-QPSK), can obtain a maximum SE of 4 bits/s/Hz. Naturally, in order to further increase the spectral efficiency, we can make full use of multi-level modulation formats which carry more than 4 bits per symbol in combination of polarization-division multiplexing, such as 16-quadrature-amplitude-modulation (16-QAM), 32-QAM, and 64-QAM and so on. However, it is well known that multi-level modulation not only requires larger optical signal-to-noise ratio (OSNR), but also is more sensitive to nonlinear propagation impairments and laser phase noise. Thus, as a tradeoff, PDM-16QAM that carries 8 bits per symbol can be a promising candidate for SE improvement. Several studies on PDM 16-QAM have already demonstrated its potential both through simulations and experiments.

So far, there are two different schemes that have been proposed to achieve very high SE with the modulation format of PDM-16QAM. The first scheme adopts the technique of coherent optical orthogonal-frequency-division-multiplexing (CO-OFDM), it has also been reported that a 485-Gb/s CO-OFDM superchannel with the modulation format of PDM-16QAM experimentally realized the transmission over 1600-km ultra-large-area fiber (ULAF) and standard single-mode-fiber (SSMF)-Based Links. The second possible scheme is the Nyquist wavelength-division multiplexing (N-WDM) technique, which is based on the use of optical pulses having an "almost" rectangular spectrum with the bandwidth ideally equal to the baud-rate. It has been recently experimentally demonstrated that the generation and transmission of the N-WDM PDM-16QAM signal with a rather high SE. Although the two above mentioned schemes potentially have the same performance, compared to N-WDM, CO-OFDM requires synchronization between the channels and much larger receiver bandwidth of the analog-to-digital converters (ADC). Therefore N-WDM is much more robust to the receiver constraints in practical implementation. As a result, the combination of N-WDM and PDM-16QAM is a promising option for future large capacity and high SE optical transmission systems and networks.

For conventional direct-detection receivers, the linear distortion due to fiber chromatic dispersion (CD) in the optical domain is converted into a nonlinear distortion in the electrical domain. Therefore, adopting a linear baseband equalizer based on only one baseband received signal can achieve only a limited performance improvements. On the other hand, for the coherent-detection receivers, the distortion due to coherent detection (CD) is converted linearly into the electrical domain. This may explain, in the case of considering CD only, why fractionally spaced equalizers with "complex coefficients" can potentially extend the system reach to distances that are only limited by the number of equalizer taps. However, in the case of CD ideally compensated, nonlinear propagation impairments and laser phase noise, to which PDM-16QAM is very sensitive, eventually set a limit on the maximum achievable transmission distance. Instead of building the equalizer in a coherent receiver, most of the complexity can be avoided by adopting pre-equalization at the transmitter, where the data is still in its uncorrupted form.

What's more, the large constellation size of PDM-16QAM also makes system sensitive to transmitter impairments, e.g., the nonlinear drive characteristic of the optical modulator and the imbalance between the frequency responses of the in-phase (I) and quadrature (Q) channels, and therefore causes signal distortion and deteriorates the system performance. As further described below, the above-mentioned transmitter impairments in the transmission of PDM-16QAM can be pre-compensated with the technique of pre-equalization, which is quite easy to implement in the digital-analog-converter (DAC) at the transmitter. Some studies focus on the application of the electronic pre-equalization, which, nowadays, is a well-known technology in optical communication. A further benefit of pre-equalization is the ability to optimize the transmitted spectrum using Nyquist-band pre-shaping pulses, which allows narrower channel spacing and higher SE.

In some disclosed embodiments, we adopt the modulation format of PDM-16QAM to generate 16-Gbaud signal in N-WDM channel on a 16-GHz grid. The present document describes the principle of pre-equalization, and then shows the comparison of bit error rate (BER) performance for the single-channel and N-WDM case with and without Nyquist-band pre-equalization. The adoption of pre-equalization can effectively pre-compensate transmitter impairments as well as reduce the effect of nonlinear propagation impairments and laser phase noise. The improved BER performance of the N-WDM implementing Nyquist-band pre-equalization shows its tolerance to narrow band filtering effect and crosstalk caused by adjacent channels. Further, an experimental setup for the generation and transmission of the 6×128-Gb/s N-WDM PDM-16QAM over 1200-km SMF-28 with Erbium-doped fiber amplifier (EDFA)-only amplification with the SE of 7.47 b/s/Hz is disclosed. To our knowledge, this represents the highest SE for the signal with the bit rate above 100-Gb/s using the PDM-16QAM modulation format. The BER for all channels (with the average OSNR of 23.6 dB) is smaller than the limitation of the forward-error-correction (FEC) limit of $3.8 \times 10^{-3}$ after 1200-km SMF-28 transmission.

Figure 12:
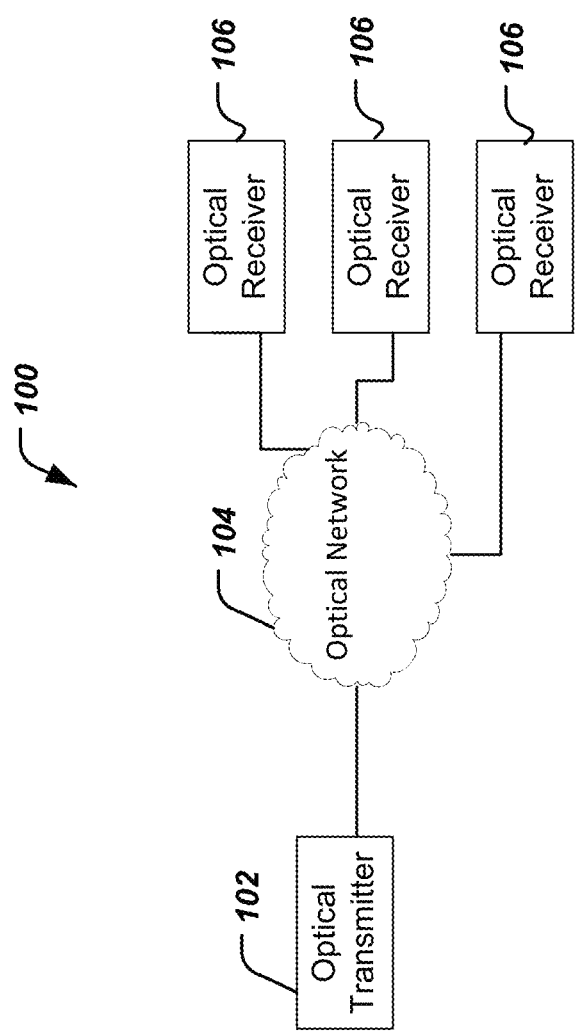
FIG. 12 depicts a block diagram representation of an optical communication system.

FIG. 12 is a block diagram representation of an optical communication system 100 where the subject technology disclosed of this document can be implemented. An optical transmitter 102 transmits optical signals through an optical network 104 to one or more optical transceivers 106. The transmitted optical signals may go through intermediate optical equipment such as amplifiers, repeaters, switch, etc., which are not shown in FIG. 12 for clarity. The disclosed transmission techniques can be implemented in the transmission subsystem of the transmitter 102. The disclosed reception techniques can be implemented in the receiver subsystem of the receiver 106.

As discussed previously, instead of only building the equalizer at the receiver, in some embodiments, a pre-equalization is implemented at the transmitter. Compared to binary-phase-shift-keying (BPSK) signals, the high-constellation level signal suffers much more uncontrolled nonlinear effects due to the imperfection of the Digital to Analog Conversion (DAC), electrical amplifier (EA), in-phase/quadrature modulator (I/Q MOD), optical filter and ADC. Therefore, in some embodiments, a BPSK signal is first transmitted over the transmitter-receiver-only link to calculate the transfer function, which is then used to pre-equalize the high-level signal to reverse the channel distortion.

FIG. 1 depicts an example of pre-equalization. One of the parallel Mach Zander Modulators (MZMs) in I/Q MOD is driven using a 16-Gbaud binary signal to generate optical BPSK. While the binary signal with 1.5× samples and a word length of $2^{15}-1$ is generated by arbitrary waveform generator (AWG). The electrical low pass filter (LPF) with 3-dB bandwidth of 7.5 GHz is adopted to suppress out-of-band noise of AWG before BPSK signal generation. The AWG operates in the interleaver mode with a sample rate of 24 Gsa/s. The continuous wavelength (CW) lightwave (CW1), generated by an external cavity laser (ECL) with the line-width less than 100 kHz and the output power of 14.5 dBm, is used as both the signal source and the local oscillator (LO) source in a self-homodyne coherent detection. The optical BPSK signal is passing through a wavelength selective switch (WSS) with 12-GHz passband before coherent detection. A real time scope with the 3-dB bandwidth of 16 GHz is used to capture the detected electrical signal, which is used to calculate the transfer function of transmitter in frequency domain. Then the transfer function is used to pre-equalize the 4-level signal. The 4-level signal with a word length of $2^{15}-1$ is used to generate the optical 16QAM via IQ modulation. A raised-cosine (R-C) filter with a roll-off factor of 0.99 is implemented for pulse shaping of 4-level signal. The pre-equalization for the I and Q output of AWG shows the similar performance and therefore we simply choose the I output of AWG to implement pre-equalization in our experiment.

A wavelength selective switch (WSS) with the 3-dB filtering bandwidth of 12 GHz is used for pre-equalization, which is different from the WSS with the 3-dB bandwidth of 10 GHz used for the WDM channel in the next section. The reason for setting WSS at different bandwidth for pre-equalization and the WDM channel shaping is to balance the pre-equalization effect and the crosstalk from the neighboring channels. In the case of adopting pre-equalization, we experimentally demonstrated the generation and transmission of the 6×128-Gb/s N-WDM PDM-16QAM signal over 1200-km SMF-28 with EDFA-only amplification, which is described in detail in Section III. The spectral efficiency is 7.47 b/s/Hz (equal to 128/16/1.07).

Experimental Results and Discussions

Figure 2:
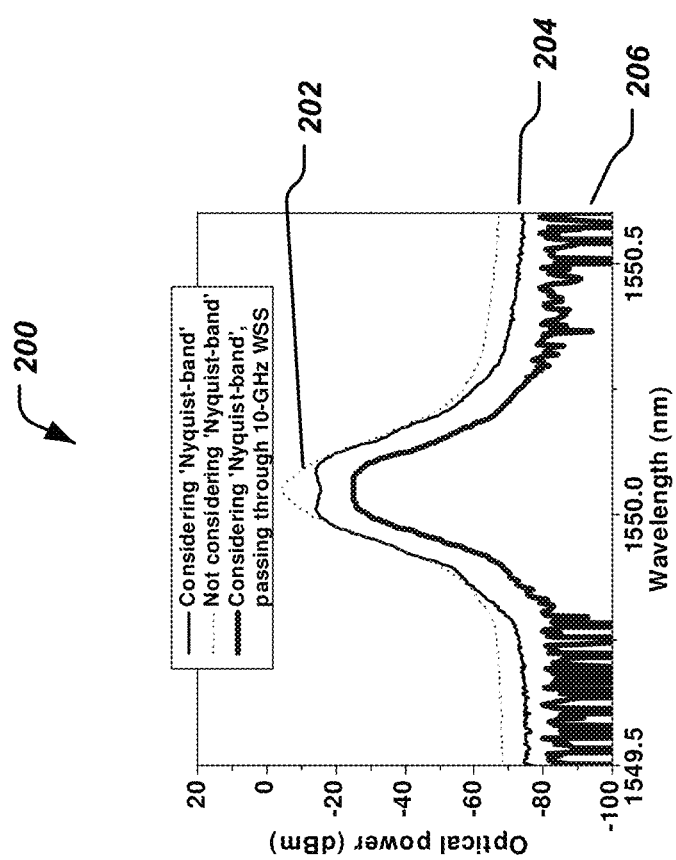
FIG. 2 depicts an optical spectrum (0.02-nm resolution) of the 16-Gbaud PDM-16QAM in the case of pre-equalization, 'Nyquist-band': WSS with passband of 12 GHz.

The optical spectrum of the 16-Gbaud PDM-16QAM in the case of with and without Nyquist-band pre-equalization is shown in graph 200 of FIG. 2. The Nyquist-band is the WSS with 12-GHz passband. Compared to the pre-equalization case without the Nyquist-band as shown as curve 202, the optical spectrum of PDM-16QAM with pre-equalization considering Nyquist-band has the function of Nyquist-like filtering profile, which can provide sufficient compensation of the narrow band filtering effects. One can see that the optical spectrum of optical PDM-16QAM with Nyquist-band pre-equalization after passing through 10-GHz WSS (206) is much narrower compared to that of the 12 GHz case (204)

Figure 3:
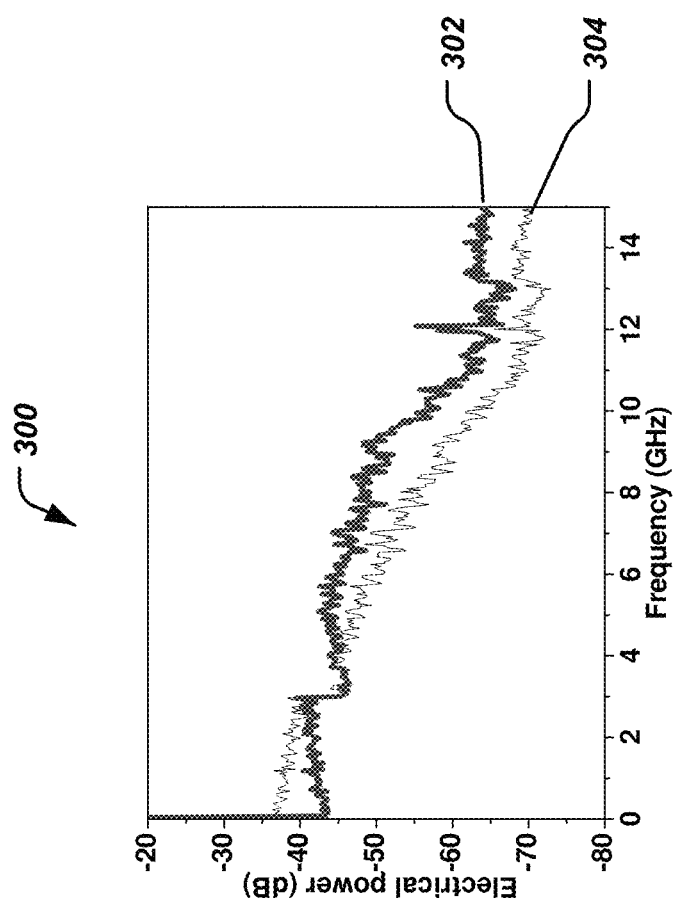
FIG. 3 depicts the electrical spectrum of the pre-equalized 16-Gbaud 4-level (in-phase of 16QAM) with and without considering 'Nyquist-band'.

The measured electrical spectrum of the 16-Gbaud 4-level signal in the case of pre-equalization with (302) and without (304) considering Nyquist-band are shown in graph 300 of FIG. 3. It can be seen that some certain high frequency components, lost due to aggressive spectrally filtering, are pre-recovered.

The Generation and Transmission of a 6×128-GB/S N-WDM PDM-16QAM Signal

Figure 4:
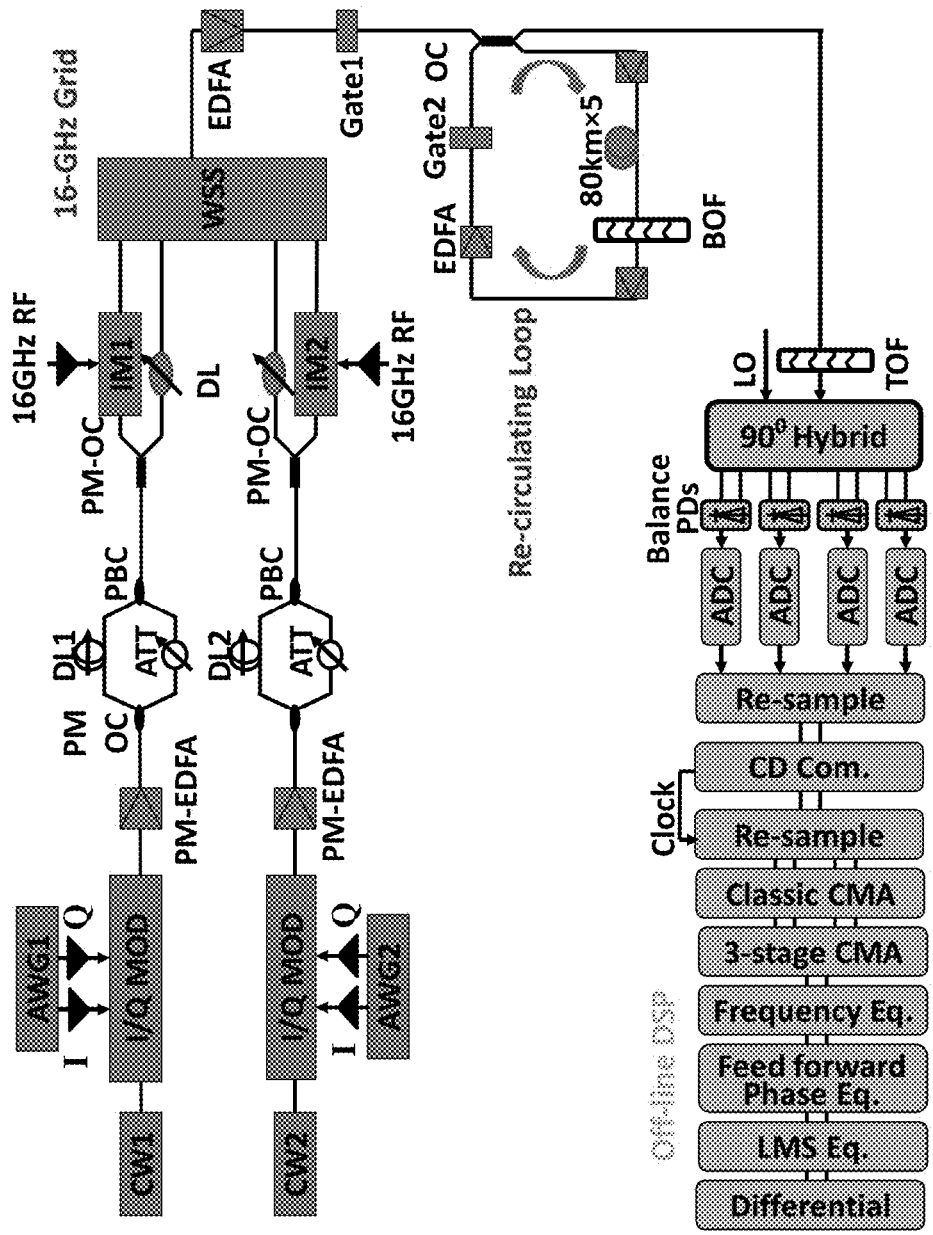
FIG. 4 is a block diagram representation of an experimental setup for the generation and transmission of a 6×128-Gb/s N-WDM PDM-16QAM. The following abbreviations are used. AWG: arbitrary waveform generator, PM-OC: polarization-maintaining optical coupler, PM-EDFA: polarization-maintaining Erbium-doped fiber amplifier, EA: electrical amplifier, IM: intensity modulator, WSS: wavelength selective switch, LO: local oscillator, TOF: tunable optical filter, BOF: bandpass optical filter, ADC: analog-digital converter.

FIG. 4 shows the experimental setup for the generation and transmission of a 6×128-Gbit/s N-WDM PDM-16QAM signal. The two 16-Gbaud electrical 16QAM signals are generated from AWG1 and AWG2, respectively. CW1 (1550.10 nm) and CW2 with frequency spacing of 0.384 nm (48 GHz) are generated from two ECLs each with the line-width less than 100 kHz and the output power of 14.5 dBm, respectively. Two I/Q MODs are used to modulate the two optical carriers (CW1 and CW2) with the I and Q components of the 64-Gb/s (16-Gbaud) electrical 16-QAM signals after the power amplification using four broadband electrical amplifiers (EA), respectively. For the operation to generate 16QAM, the two parallel MZMs in I/Q MOD are both biased at the null point and driven at the full swing to achieve zero-chirp 0- and π-phase modulation. The phase difference between the upper and the lower branch of I/Q MOD is controlled at π/2. After the power boost by polarization-maintaining EDFAs (PM-EDFA), the polarization multiplexing of each path is realized by the polarization-multiplexer, comprising a polarization-maintaining optical coupler (PM-OC) to halve the signal, an optical delay line to provide a delay of 150 symbols, and a polarization beam combiner (PBC) to recombine the signal. Next, in the upper path, the PDM-16QAM optical signal is halved into two branches again by the second PM-OC, where the signal passing through the upper branch is handled by an intensity modulator (IM1) driven by a 16-GHz sinusoidal radio frequency (RF) signal and DC-biased at the null point, while the signal passing through the lower branch is dealt with the second optical delay line. So do operation to the lower path. It is noted that IM1 and IM2 are used to implement optical carrier suppression (OCS) modulation [18]. The four branches, with the uppermost and the lowermost each including two subcarriers, are spectrally filtered and combined using a programmable 4-channel WSS on a 16-GHz grid with 3-dB filtering bandwidth of 10 GHz. The insertion loss of WSS is 7 dB.

The N-WDM PDM-16QAM signal is launched into the circle loop of 5×80-km SMF-28, with three circulations. Each span has the average loss of 18 dB and the chromatic dispersion of 17 ps/km/nm at 1550 nm, in the absence of optical dispersion compensation. EDFA is used to compensate the loss of each span. The total launched power (after EDFA) into each span is 10 dBm, corresponding to ~1 dBm per channel at 128 Gb/s. A tunable optical band-pass filter (BOF) with the bandwidth of 1.27 nm is used in the loop to remove the ASE noise for each circle of the recirculating loop. At the receiver, a tunable optical filter (TOF) with the 3-dB bandwidth of 0.35 nm is used to choose the desired channel. An ECL with a line-width less than 100 kHz is used as the local oscillator (LO). A polarization-diverse 90 degree hybrid is used to realize the polarization and phase-diverse coherent detection of the LO and the received optical signal before balanced detection. The ADC is realized in the digital scope with the sample rate of 50 GSa/s and the electrical bandwidth of 9 GHz.

For the DSP, the electrical polarization recovery is achieved using a three-stage blind equalization scheme: First, the clock is extracted using the "square and filter" method, and then the digital signal is re-sampled at twice of the baud rate based on the recovery clock. Second, a T/2-spaced time-domain finite impulse response (FIR) filter is used for the compensation of CD, where the filter coefficients are calculated from the known fiber CD transfer function using the frequency-domain truncation method. Third, two complex-valued, 13-tap, T/2-spaced adaptive FIR filters are used to retrieve the modulus of the 16QAM signal. The two adaptive FIR filters are based on the classic constant modulus algorithm (CMA) and followed by three-stage CMA, to realize multi-modulus recovery and polarization de-multiplexing. The carrier recovery is performed in the subsequent step, where the 4-th power is used to estimate the frequency offset between the LO and the received optical signal. The phase recovery is obtained by feed-forward and Least-Mean-Square (LMS) algorithms for offset compensation. Finally, differential decoding is used for BER calculating after decision.

Back-to-Back Experimental Results and Discussions

Figure 5:
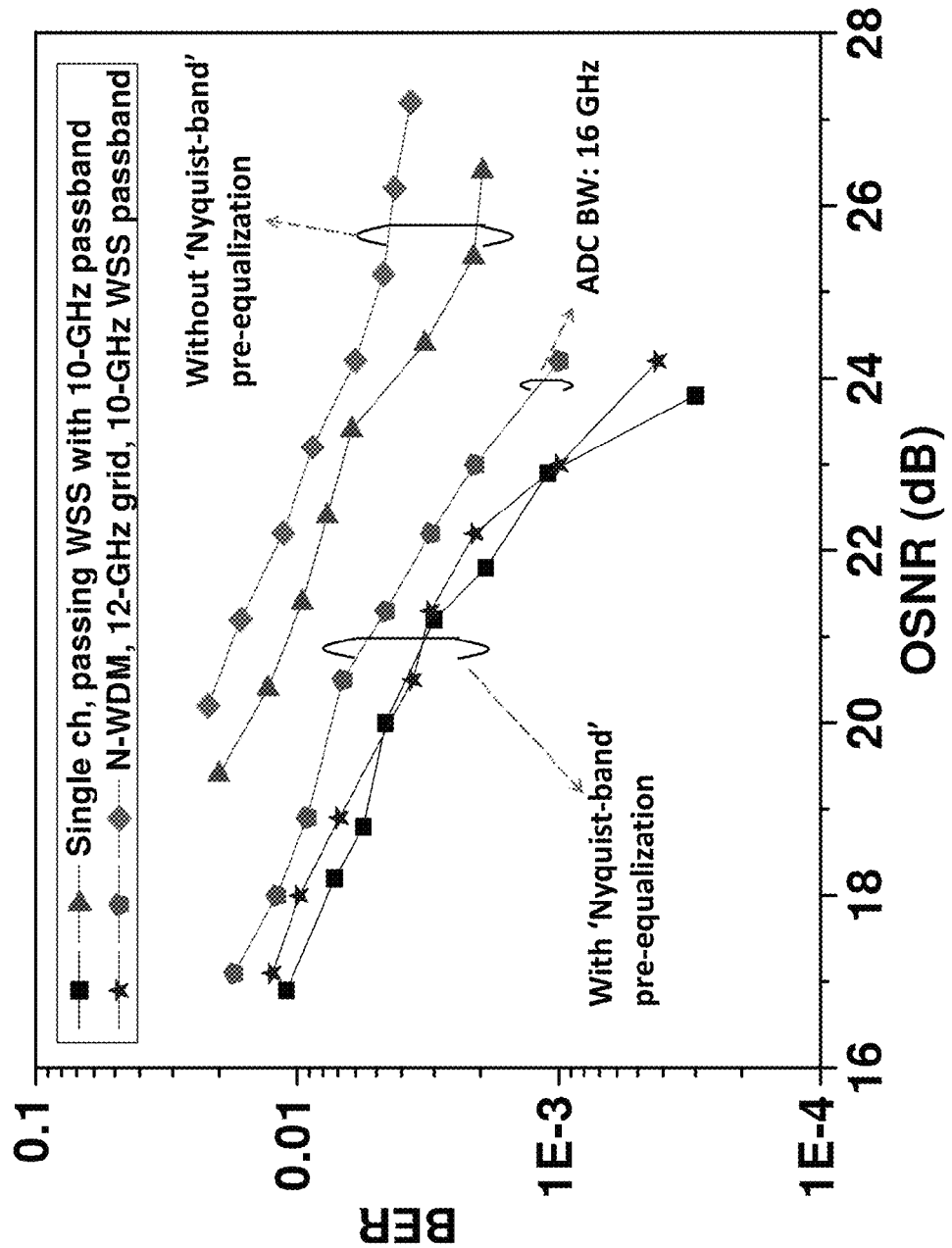
FIG. 5 depicts back-to-back BER performance of the 16-Gbaud PDM-16QAM as a function of OSNR. BW: bandwidth.

The back-to-back BER for the 16-Gbaud PDM-16QAM at the N-WDM channel of 1550.10 nm is shown in FIG. 5, as a function of OSNR, for five different cases. The scope has a bandwidth of 9 GHz and a sample rate of 50 GSa/s. These four different cases include the back-to-back single-channel and N-WDM PDM-16QAM cases, each of which with and without Nyquist-band pre-equalization. In the WDM cases, the 6 channels 16-Gbaud PDM-16QAM is on a 16-GHz grid, and all the channels of the four cases are passed through the WSS with 10-GHz passband. In the case of pre-equalization with Nyquist-band, single channel case, the required OSNR for the BER of $3.8 \times 10^{-3}$ is 20.6 dB, the required OSNR penalty corresponding to its WDM case can be neglected. This is because the adoption of pre-equalization can effectively pre-compensate the transmitter impairments as well as reduce the effects of nonlinear propagation impairments and laser phase noise. Meanwhile, the experiments indicate that the 10-GHz filtering bandwidth equipped with 12-GHz Nyquist-band pre-equalization is narrow enough to avoid the crosstalk from adjacent channels. While the required OSNR penalty increases to 1 dB at the BER of $1 \times 10^{-3}$ with ADC bandwidth of 16 GHz. This result reflects an important fact that the required bandwidth of ADC plays an important role in the detection of N-WDM PDM-16QAM signal. The bandwidth of ADC with "half of baud rate frequency" is of benefit to the suppression for the noise and neighboring channel signal. For the single channel case without Nyquist-band pre-equalization and passing though the 10-GHz WSS, the required OSNR for the BER of $3.8 \times 10^{-3}$ is 24 dB. The required OSNR penalty is 4~5 dB compared to that the case of with Nyquist-band pre-equalization. This is because the PDM-16QAM is quite sensitive to the narrow filtering effects and noise. For the N-WDM case without Nyquist-band pre-equalization, there is extra 1.5 dB OSNR penalty caused by the crosstalk from the adjacent channels.

Experimental Results and Discussions after Transmission Over 1200 km

Figure 6:
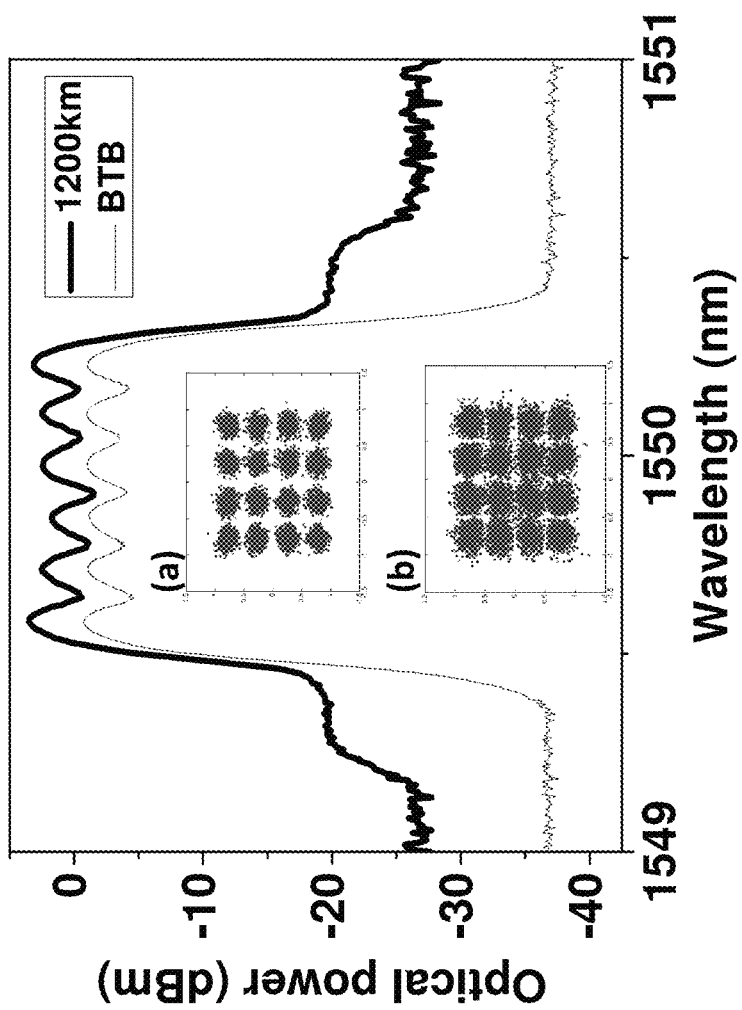
FIG. 6. shows example optical spectrum (0.1-nm resolution) before and after 1200-km SMF-28 transmission with EDFA-only amplification, and the obtained signal constellations before and after transmission are inserted as (a) and (b), respectively.

FIG. 6 shows the optical spectra before and after 1200-km SMF-28 transmission with EDFA-only amplification. The obtained corresponding constellations are inserted in FIG. 6 as (a) and (b), respectively. The OSNR of the signal after transmission over 1200-km SF-28 is 23.6 dB.

Figure 7:
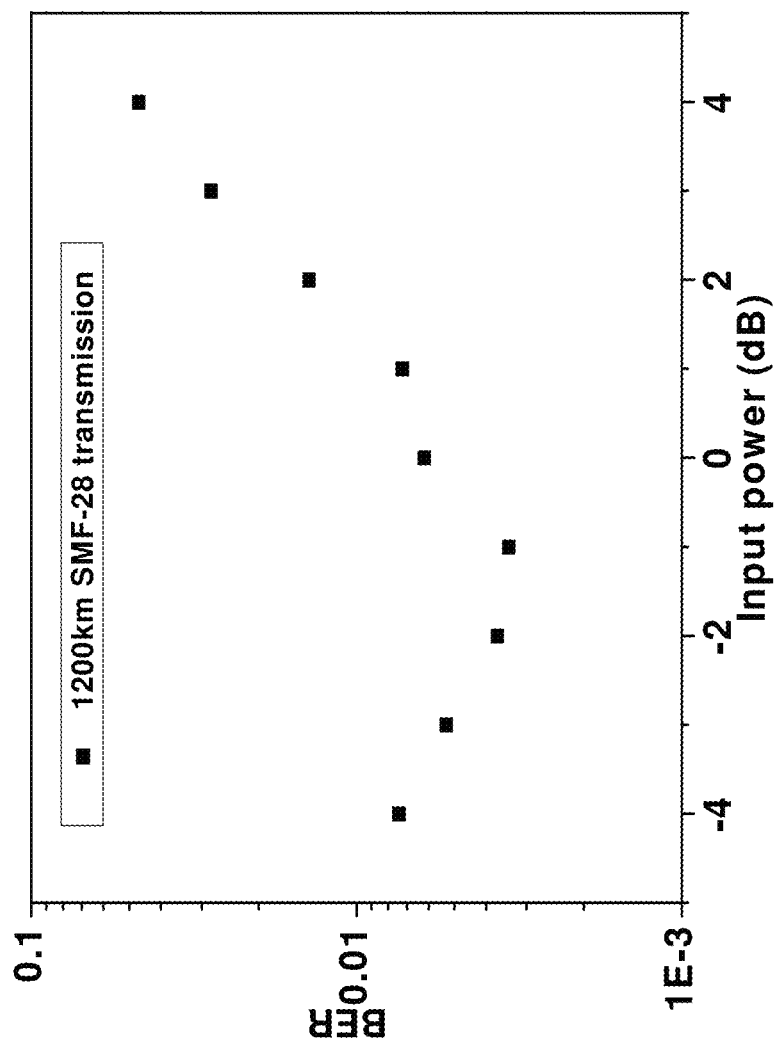
FIG. 7 illustrates the varying BER performance of the N-WDM channel at 1550.10 nm versus the launched power after transmission over 1200-km SMF-28.

FIG. 7 depicts the varying BER performance of the N-WDM channel at 1550.10 nm after 1200-km SMF-28 transmission by changing the launched power into each span fiber.

Figure 8:
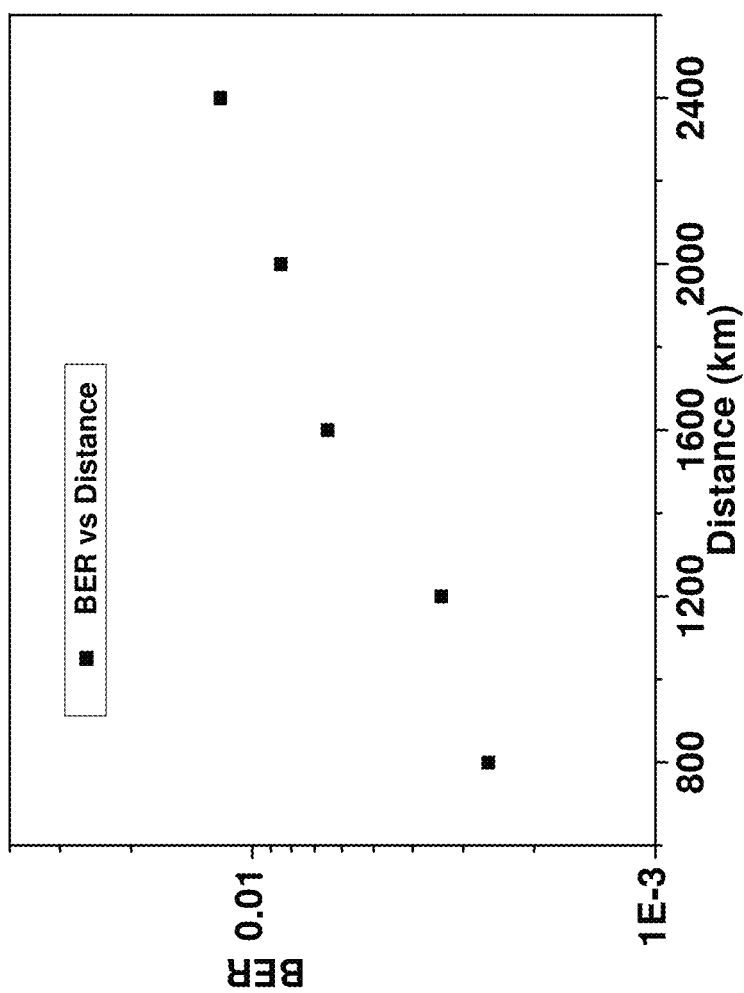
FIG. 8. illustrates the varying BER performance of the N-WDM channel at 1550.1 nm versus the transmission distance.

We can see from FIG. 8 that the launched power of −1 dBm gives the best BER performance. FIG. 8 depicts the varying BER performance of the N-WDM channel at 1550.10 nm after transmission by changing the transmission distance, in the case of the launched power of −1 dBm/channel.

Figure 9:
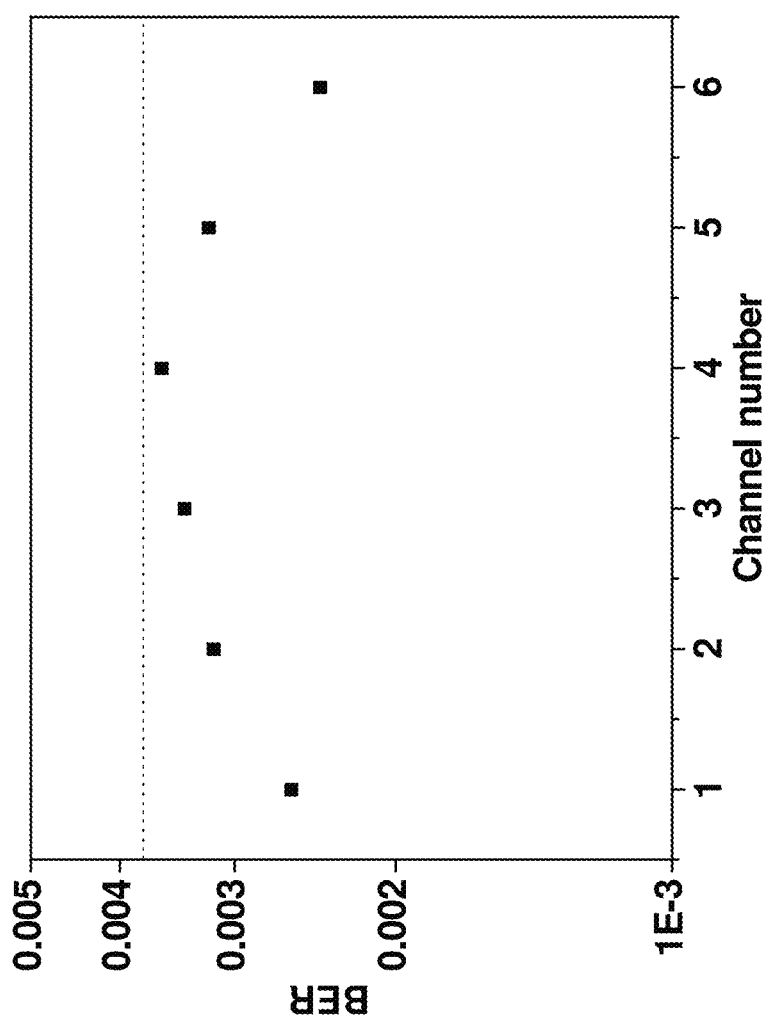
FIG. 9 depicts example BER for each of the 6 channels after transmission over 1200-km SMF-28 at the optimal input power.

As shown in FIG. 9, after transmission over 1200-km SMF-28, the BER for each of the 6 channels (the average OSNR of 23.6 dB) is smaller than the limitation of FEC limit of $3.8 \times 10^{-3}$.

FIG. 10 is a flow chart representation of a process 1000 of optical communication. The process 1000 may be implemented, for example, at a transmitter-side. At 1002, a test signal is transmitted over an optical communication medium using a first optical modulation format. As previously described, the test signal may comprise a binary phase shift keying signal that may be passed through a wavelength selective switch.

At 1004, a reception report for the test signal. The reception report may include, e.g., a transfer function estimate computed by a receiver.

At 1006, based on the received reception report, a pre-equalization scheme is determined. The pre-equalization scheme may, e.g., select a pre-equalization filter that compensates the estimated channel transfer function (e.g., reciprocal of the estimated channel function). Other pre-equalization schemes are disclosed in the present document.

At 1008, the determined pre-equalization scheme is applied to data to be transmitted at a transmitter side to generate pre-equalized data. Using the scheme, e.g., data may be filtered through the inverse channel transfer function filter. As discussed previously, the data may be modulated using 16 QAM or another modulation technique prior to pre-equalization.

At 1010, transmitting the pre-equalized data over the optical communication medium using a second optical modulation format based on the reception report. In some embodiments, the data may be modulated prior to the application of pre-equalization filter. In some embodiments, the data may be modulated after the application of a pre-equalization technique (e.g., error correction coding or filtering).

FIG. 11 is a block diagram representation of an apparatus 1100 for optical communication. The module 1102 is for transmitting a test signal over an optical communication medium using a first optical modulation format. The module 1104 is for receiving a reception report for the test signal. The module 1106 is for determining, based on the received reception report, a pre-equalization scheme. The module 1108 is for applying the pre-equalization scheme to data to be transmitted at a transmitter side to generate pre-equalized data. The module 1110 is for transmitting the pre-equalized data over the optical communication medium using a second optical modulation format based on the reception report. The apparatus 1100 and modules 1102, 1104, 1106, 1108 and 1110 may be further configured to perform some of the techniques disclosed in this document.

It will be appreciated that various techniques are disclosed for achieving high data throughput in optical communication.

It will further be appreciated that the generation and transmission of the 6×128-Gb/s N-WDM PDM-16QAM signal on a 16-GHz grid over 1200-km SMF-28 with EDFA-only amplification and with a net SE of 7.47 b/s/Hz is disclosed. This is, to our knowledge, the highest SE for the signal with the bit rate above 100 Gb/s using the PDM-16QAM modulation format. This experiment was successfully enabled by, among other techniques. a DSP pre-equalization of transmitter-side impairments and/or a DSP post-equalization of the channel and receiver-side impairments. The benefit from the disclosed Nyquist-band pre-equalization scheme was experimentally demonstrated. The BER for all channels is smaller than the limitation of the FEC limit of $3.8\times10^{-3}$ over a 1200-km SMF-28 transmission link.

It will also be appreciated that a Nyquist wavelength-division multiplexing technique is described. The Nyquist wavelength-division multiplexing technique enables a solution to achieve high spectral efficiency in long-haul transmission system. A polarization division multiplexing quadrature-phase-shift-keying, even high-level modulation scheme such as polarization division multiplexing 16-quadrature-amplitude-modulation is much more sensitive to intra-channel noise and inter-channel linear crosstalk caused by Nyquist wavelength-division multiplexing.

It will further be appreciated that techniques for pre-equalization of optically modulated data are disclosed. In another aspect, optical transmission techniques that use higher modulation schemes, such as 16 QAM, are disclosed.

The disclosed and other embodiments, modules and the functional operations (e.g., a test signal transmitter, a reception report receiver, a pre-equalization scheme determiner, a pre-equalizer, a data transmitter, etc.) described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:
1. A method for optical communication, comprising:
generating a test signal by passing a signal having a baud rate through a first wavelength selective switch (WSS) having a first bandwidth;
transmitting the test signal over an optical communication medium using a first optical modulation format;
receiving a reception report, including an estimated transfer function of the optical communications medium, for the test signal;

determining, based on the estimated transfer function of the optical communications medium, a pre-equalization scheme;

applying the pre-equalization scheme to data to be transmitted at a transmitter side to generate pre-equalized data having the baud rate;

processing the pre-equalized data using a second WSS, wherein the second WSS has a second bandwidth greater than the first bandwidth to balance pre-equalization effect and crosstalk from neighboring channels; and transmitting the processed pre-equalized data over the optical communication medium using a second optical modulation format based on the reception report.

2. The method recited in claim 1, wherein the first optical modulation format comprises binary phase shift keying (BPSK).

3. The method recited in claim 1, wherein the second optical modulation format includes Nyquist wavelength division multiplexing.

4. The method recited in claim 3, wherein the second optical modulation format further includes polarization division multiplexing based on 16-Quadrature Amplitude modulation.

5. The method recited in claim 1, wherein the pre-equalization scheme uses the inverse of the estimated transfer function of the optical communications medium.

6. The method recited in claim 1, wherein the generated test signal uses PDM-16QAM modulation format and transmission of the processed pre-equalized data reaches a spectral efficiency (SE) equal to or higher than 7 b/s/Hz.

7. An optical communication apparatus, comprising:
a test signal generator that generates a test signal by passing a signal with a baud rate through a first wavelength selective switch (WSS) having a first bandwidth;
a test signal transmitter that transmits the test signal over an optical communication medium using a first optical modulation format;
a reception report receiver that receives a reception report, including an estimated transfer function of the optical communications medium computed by an optical receiver, for the test signal;
a pre-equalization scheme determiner that determines, based on the estimated transfer function of the optical communications medium, a pre-equalization scheme;
a pre-equalizer that applies the pre-equalization scheme to data to be transmitted at a transmitter-side to generate pre-equalized data with the baud rate;
a pre-equalizer processor that processes the pre-equalized data using a second WSS, wherein the second WSS has a second bandwidth to balance pre-equalization effect and crosstalk from neighboring channels; and
a data transmitter that transmits the processed pre-equalized data over the optical communication medium using a second optical modulation format based on the reception report.

8. The apparatus recited in claim 7, wherein the first optical modulation format comprises binary phase shift keying (BPSK).

9. The apparatus recited in claim 7, wherein the second optical modulation format includes Nyquist wavelength division multiplexing.

10. The apparatus recited in claim 9, wherein the second optical modulation format further includes polarization division multiplexing based on 16-Quadrature Amplitude modulation.

11. The apparatus recited in claim 7, wherein the pre-equalization scheme uses the inverse of the estimated transfer function of the optical communications medium.

12. The apparatus recited in claim 7, wherein the generated test signal uses PDM-16QAM modulation format and transmission of the processed pre-equalized data reaches a SE equal to or higher than 7 b/s/Hz.

13. An optical communication apparatus, comprising:
a memory that stores instructions; and
a processor that reads the instructions and controls operations including:
generating a test signal by passing a signal with a baud rate through a first wavelength selective switch (WSS) having a first bandwidth;
transmitting the test signal over an optical communication medium using a first optical modulation format;
receiving a reception report, including an estimated transfer function of the optical communications medium computed by an optical receiver, for the test signal;
determining, based on the estimated transfer function of the optical communications medium, a pre-equalization scheme;
applying the pre-equalization scheme to data to be transmitted at a transmitter-side to generate pre-equalized data with the baud rate;
processing the pre-equalized data using a second WSS, wherein the second WSS has a second bandwidth greater than the first bandwidth to balance pre-equalization effect and crosstalk from neighboring channels; and
transmitting the processed pre-equalized data over the optical communication medium using a second optical modulation format based on the reception report.

14. An optical communication system, comprising:
an optical transmission apparatus that is configured for performing operations comprising:
generating a test signal by passing through a first wavelength selective switch (WSS);
transmitting the test signal over an optical communication medium using a first optical modulation format;
receiving a reception report computed by an optical receiver, including an estimated channel transfer function, for the test signal;
determining, based on the estimated channel transfer function, a pre-equalization scheme;
applying the pre-equalization to data to be transmitted at a transmitter side to generate pre-equalized data with the baud rate;
processing the pre-equalized data using a second WSS, wherein the second WSS has a bandwidth greater than the first bandwidth to balance pre-equalization effect and crosstalk from neighboring channels; and
transmitting the pre-equalized data over the optical communication medium using a second optical modulation format based on the reception report; and
an optical reception apparatus that is configured for performing operations comprising:
receiving the test signal;
computing the estimated channel transfer function based on the received test signal; and
transmitting the reception report, including the computed estimated channel transfer function.

15. The optical communication system recited in claim 14, wherein the first optical modulation format comprises binary phase shift keying (BPSK).

16. The optical communication system recited in claim 14, wherein the second optical modulation format includes Nyquist wavelength division multiplexing.

17. The optical communication system recited in claim 16, wherein the second optical modulation format further includes polarization division multiplexing based on 16-Quadrature Amplitude modulation.

18. The optical communication system recited in claim 14, wherein the pre-equalization scheme uses the inverse of the estimated transfer function of the optical communications medium.

19. The optical communication system recited in claim 14, wherein the generated test signal uses PDM-16QAM modulation format and transmission of the processed pre-equalized data reaches a SE equal to or higher than 7 b/s/Hz.

* * * * *